US006826328B2

(12) United States Patent
Hwang et al.

(10) Patent No.: US 6,826,328 B2
(45) Date of Patent: Nov. 30, 2004

(54) SOLDERING APPARATUS AND METHOD FOR A COLLIMATOR

(75) Inventors: Myeon-soon Hwang, Suwon (KR); Tai-hwan Park, Suwon (KR); Hong-suk Sun, Suwon (KR); Byung-gon Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/175,319

(22) Filed: Jun. 20, 2002

(65) Prior Publication Data
US 2003/0185539 A1 Oct. 2, 2003

(30) Foreign Application Priority Data

Feb. 14, 2002 (KR) .......................................... 2002-7984

(51) Int. Cl.[7] ................................................ G02B 6/32
(52) U.S. Cl. ........................................ 385/33; 385/134
(58) Field of Search ............................. 385/33–35, 147, 385/134, 74, 79, 93; 359/811, 819

(56) References Cited

U.S. PATENT DOCUMENTS

| 6,023,542 A | | 2/2000 | Pan et al. | |
| 6,167,175 A | * | 12/2000 | Zheng et al. | ................. 385/47 |
| 6,396,980 B1 | * | 5/2002 | Liu et al. | ..................... 385/34 |
| 6,485,190 B1 | * | 11/2002 | Zheng | .......................... 385/61 |
| 6,674,942 B2 | * | 1/2004 | Chang et al. | ................. 385/34 |
| 2004/0013363 A1 | * | 1/2004 | Lee et al. | ..................... 385/33 |

* cited by examiner

Primary Examiner—John D. Lee
Assistant Examiner—Mike Stahl
(74) Attorney, Agent, or Firm—Staas & Halsey LLP

(57) ABSTRACT

An apparatus to solder a plurality of collimators into a housing formed with a plurality of through holes spaced from each other at a predetermined distance along a longitudinal direction thereof includes a housing accommodating part to accommodate the housing. The apparatus also includes a housing dispensing unit including a housing chucking part to chuck the housing accommodated in the housing accommodating part, and a housing carrying part to carry the housing chucking part to a predetermined soldering position. The apparatus includes a plurality of collimator grip units including grip parts, each to grip the plurality of collimators and move near to and distant from each other relative to the soldering position to insert the plurality of collimators into the housing moved to the soldering position. The apparatus includes a soldering unit disposed adjacent to the soldering position, to solder the plurality of collimators into the housing through the through holes of the housing. Therefore, a soldering apparatus and a method for a collimator, in which a collimator assembly is automatically soldered, reduces time taken to manufacture the collimator assembly and increases reliability of the collimator assembly.

27 Claims, 14 Drawing Sheets

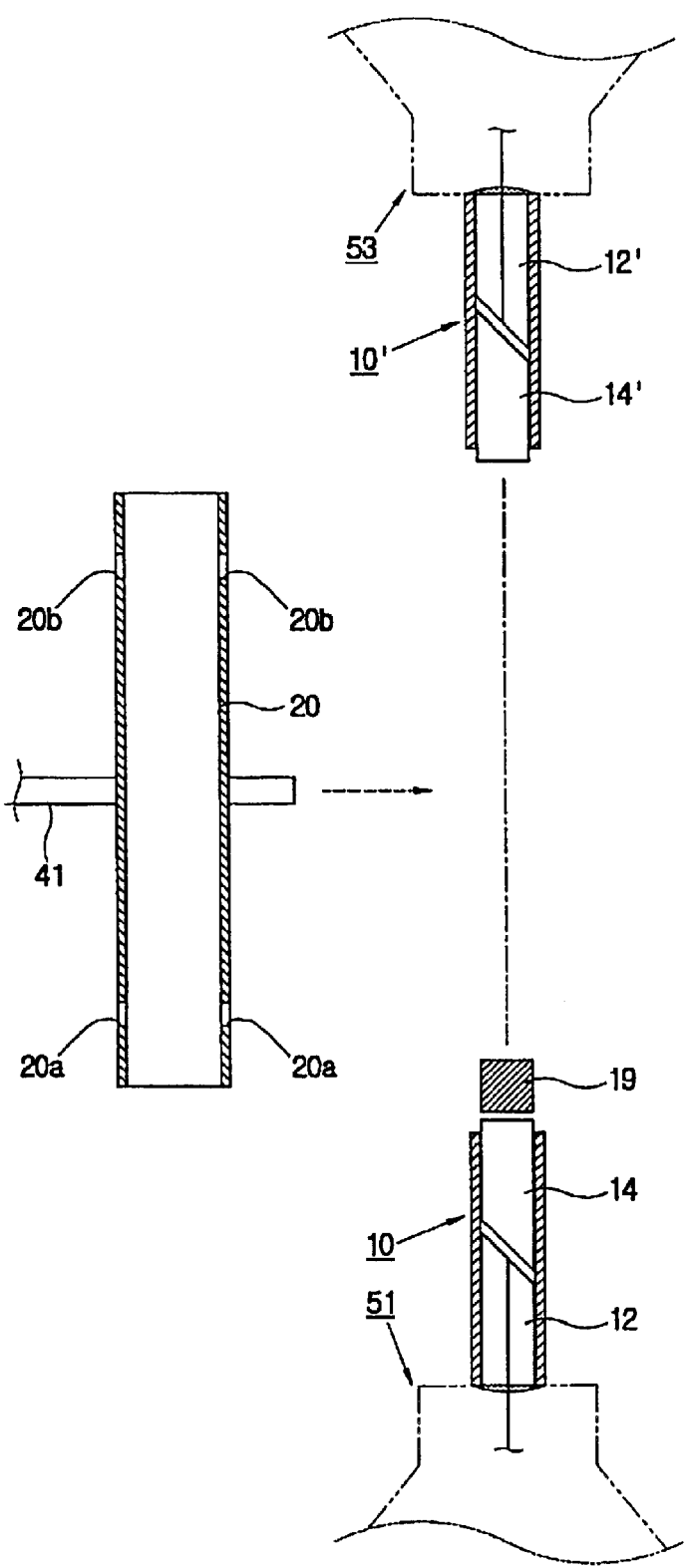

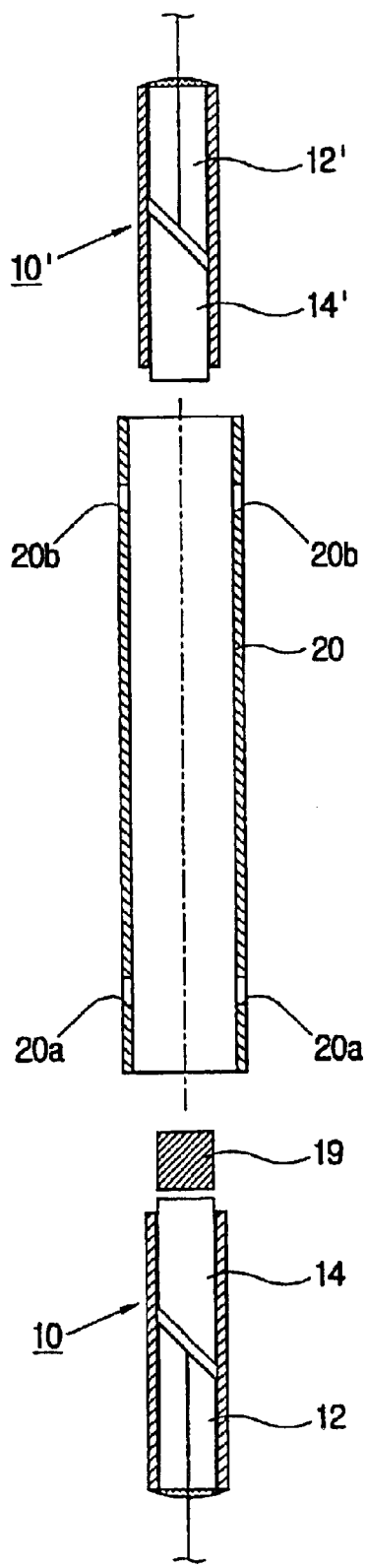

SOLDERING APPARATUS AND METHOD FOR A COLLIMATOR

CROSS-REFERENCE TO RELATED APPLICATIONS

This application claims the benefit of Korean Application No. 2002-7984, filed Feb. 14, 2002, in the Korean Industrial Property Office, the disclosure of which is incorporated hereby by reference.

BACKGROUND OF THE INVENTION

1. Field of the Invention

The present invention relates to a soldering apparatus and a method for a collimator.

2. Description of the Related Art

A collimator is an optical communication device collimating a ray emitted from a light source. The collimator is employed as a component of equipment such as optical communication equipment, semiconductor manufacturing equipment, etc., which use parallel light.

As shown in FIG. 1, a collimator 10 generally includes a pigtail 12 and a GRIN (gradient index) lens 14 which are coaxially arranged, a glass tube 15 to accommodate and support the pigtail 12 and the GRIN lens 14, and a metal sleeve 16 to protect the glass tube 15. The pigtail 12 is made of glass, and a fiber 13 forming a path of an incident ray is connected therethrough from one end part of the pigtail 12. An inclined part 12a is formed on the other end part of the pigtail 12 and has a predetermined inclination angle. Further, the GRIN lens 14 is provided with an inclined part 14a on one end thereof which is in correspondence with the inclined part 12a of the pigtail 12.

To manufacture the collimator 10 in accordance with the above configuration, the GRIN lens 14 is first inserted into the glass tube 15, and fastened therein. The end part of the GRIN lens 14 formed with the inclined part 14a is located inside the glass tube 15, and the other end part thereof protrudes out of the glass tube 15 via a predetermined length.

After the GRIN lens 14 is accommodated in and supported by one side of the glass tube 15, the pigtail 12 is inserted in the other side of the glass tube 15. The end part of the pigtail 12 formed with the inclined part 12a is accommodated inside the glass tube 15 and faces the inclined part 14a of the GRIN lens 14 which is also accommodated inside the glass tube 15.

After the pigtail 12 is inserted in the glass tube 15, the inclined part 12a of the pigtail 12 is aligned to obtain desired optical properties. The pigtail 12 is then fastened inside the glass tube 15. Thereafter, the glass tube 15 accommodating and supporting the GRIN lens 14 and the pigtail 12 is inserted into the metal sleeve 16. Then the glass tube 15 is fastened onto the metal sleeve 16 by applying an epoxy resin 17 to one end of the metal sleeve 16 to complete the manufacturing of collimator 10.

The completed collimator 10 is used as an individual component. However, as shown in FIG. 2, a collimator assembly 1 made by securing a pair of completed collimators 10 and 10' inside a housing 20 having a tube shape, is employed as a component of communication equipment.

Conventionally, the collimator assembly 1 has been manufactured manually. For example, each of the pair of collimators 10 and 10' is inserted into opposite sides of the housing 20, and then soldered inside the housing 20. Consequently, manufacturing the collimator assembly 1 in this way takes a large amount of time, thereby decreasing productivity and reliability of the collimator assembly 1.

SUMMARY OF THE INVENTION

Accordingly, it is an object of the present invention to provide a soldering apparatus and a method for a collimator, in which a collimator assembly is automatically soldered, thereby reducing an amount of time taken to manufacture the collimator assembly and increasing reliability of the collimator assembly.

Additional objects and advantages of the invention will be set forth in part in the description which follows and, in part, will be obvious from the description, or may be learned by practice of the invention.

The foregoing and other objects of the present invention are achieved by providing an apparatus to solder a plurality of collimators into a housing formed with a plurality of through holes spaced from each other at a predetermined distance along a longitudinal direction thereof. The apparatus includes a housing accommodating part to accommodate the housing, a housing dispensing unit including a housing chucking part to chuck the housing accommodated in the housing accommodating part, and a housing carrying part to carry the housing chucking part to a predetermined soldering position. The apparatus also includes a plurality of collimator grip units including grip parts, each to grip the plurality of collimators, and moving near to and distant from each other relative to the soldering position to insert the plurality of collimators into the housing moved to the soldering position. The apparatus includes a soldering unit disposed adjacent to the soldering position to solder the plurality of collimators into the housing through the through holes of the housing.

According to an aspect of the invention, the plurality of collimator grip units include a first grip unit having a first grip part to grip a first collimator, and a first lifting part to move the first grip part to the soldering position. The plurality of collimator grip units also include a second grip unit disposed facing toward the first grip unit, and having a second grip part to grip a second collimator, and a second moving part to move the second grip part to the soldering position.

According to an aspect of the invention, the soldering unit includes a soldering part disposed adjacent to a respective one of the through holes of the housing, a soldering rod provided at the soldering part and disposed between a respective one of the collimators and the housing by passing through the respective through hole of the housing, and a heating part combined to the soldering part and heating the soldering rod.

According to an aspect of the invention, the soldering part is disposed inclined toward the longitudinal direction of the housing.

According to another aspect of the invention, the apparatus further includes a soldering unit carrying part to move the soldering unit along the longitudinal direction of the housing.

According to another aspect of the invention, the apparatus further includes a control part to automatically control the housing dispensing unit, the collimator grip unit, and the soldering unit, and the soldering unit carrying part.

The foregoing and other objects of the present invention are achieved by providing a method to solder a plurality of collimators into a housing formed with a plurality of through holes spaced from each other at a predetermined distance along a longitudinal direction thereof. The method includes dispensing the housing to a predetermined soldering position, inserting the plurality of collimators into the housing moved to the soldering position, and soldering the plurality of collimators to the housing through the through holes of the housing.

According to an aspect of the invention, the soldering includes inserting a soldering rod into the through holes of the housing at an inclined position.

BRIEF DESCRIPTION OF THE DRAWINGS

The above and other objects and advantages of the invention will become apparent and more appreciated from the following description of the preferred embodiments, taken in conjunction with the accompanying drawings of which:

FIGS. 6A through 6H are illustrations of a soldering process for the soldering apparatus in FIG. 3.

DETAILED DESCRIPTION OF THE PREFERRED EMBODIMENTS

Figure 1:
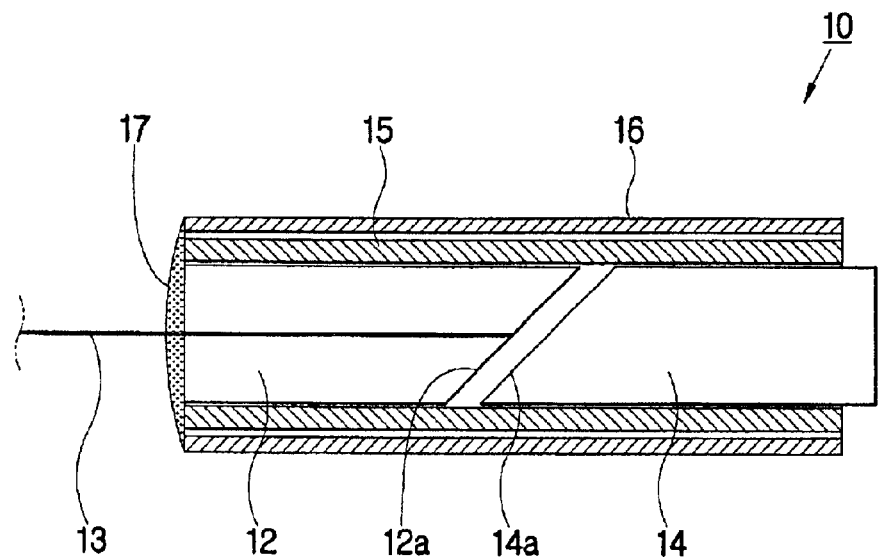
FIG. 1 is a sectional view of a conventional collimator.

Reference will now be made in detail to the present preferred embodiments of the present invention, examples of which are illustrated in the accompanying drawings, wherein like reference numerals refer to like elements throughout.

Figure 2:
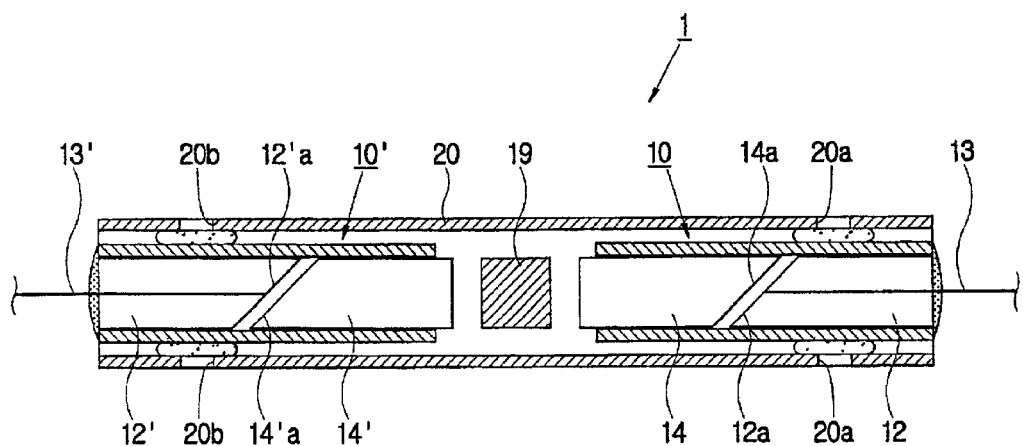
FIG. 2 is a sectional view of a conventional collimator assembly having a pair of collimators soldered inside a housing.

To manufacture a collimator assembly 1, as shown in FIG. 2, a first collimator 10 and second collimator 10' are each manufactured as shown in FIG. 1, and then soldered inside a housing 20 having a tube shape. Between the first collimator 10 and the second collimator 10' is provided a filter 19, to filter light traveling from the first collimator 10 to the second collimator 10'. The housing 20 is made of metal and formed with a pair of first and second through holes 20a and 20b, respectively, which are spaced from each other at a predetermined distance along a longitudinal direction thereof.

Figure 3:
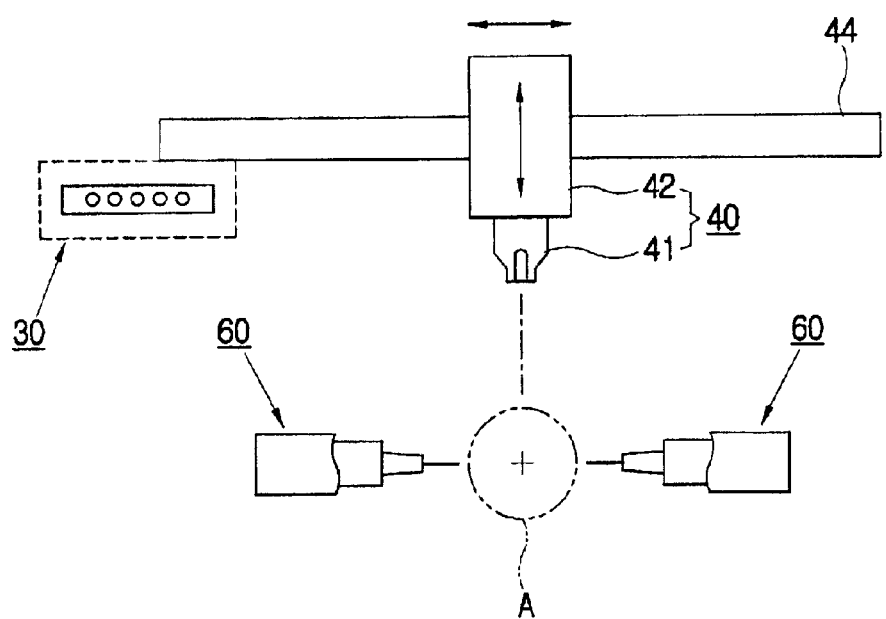
FIG. 3 is a schematic plan view of a soldering apparatus for a collimator, according to an embodiment of the present invention.
Figure 4:
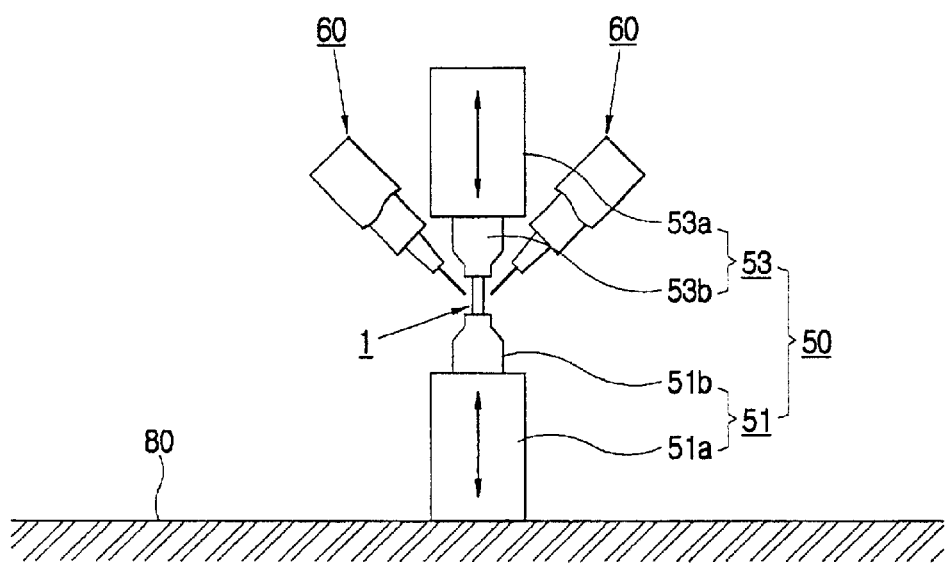
FIG. 4 is a schematic side view of the soldering apparatus in FIG. 3.
Figure 7:
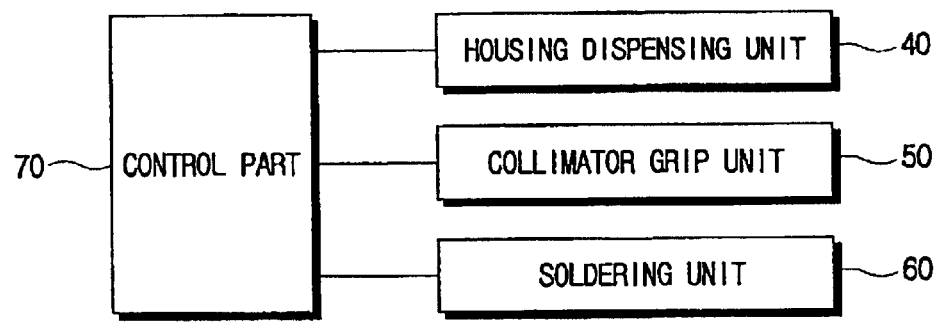
FIG. 7 is a control block diagram of the soldering apparatus of the soldering apparatus in FIG. 3.

As shown in FIGS. 3 and 4, a soldering apparatus for a collimator includes a housing accommodating part 30 to accommodate a plurality of housings 20, a housing dispensing unit 40 to dispense the housing 20 to a soldering position "A", a collimator grip unit 50 to grip the first collimator 10 and the second collimator 10' which are accommodated in the housing 20, and a pair of soldering units 60 to solder the first collimator 10 and the second collimator 10' inside the housing 20. Herein, the soldering position "A" indicates a position at which the first collimator 10 and the second collimator 10' are inserted into the housing 20 dispensed by the housing dispensing unit 40 and then soldered therein. The housing dispensing unit 40, the collimator grip unit 50, and the soldering unit 60 are, as shown in FIG. 7, automatically controlled by a control part 70.

The housing dispensing unit 40 includes a housing chucking part 41 to chuck one of a plurality of housings 20 accommodated in the housing accommodating part 30, and a housing carrying part 42 to carry the housing chucking part 41 to the soldering position "A". The housing chucking part 41 has a clamp shape to chuck and release the housing 20, and chucks one of the plurality of housings 20 accommodated in the housing accommodating part 30. The housing carrying part 42 is slidingly engaged with a rail 44, and moves horizontally and vertically on the rail 44. The housing carrying part 42 is provided with a driving unit (not shown) such as a motor, a pneumatic cylinder, etc., for horizontal and vertical movement.

The collimator grip unit 50 includes a first grip unit 51 and a second grip unit 53 which are spaced from each other at a predetermined distance along a vertical direction of the soldering position "A". The first grip unit 51 includes a first lifting part 51a which is supported by a soldering table 80 and moves up and down. The first grip unit 51 also includes a first grip part 51b which is combined to the first lifting part 51a and grips the first collimator 10 in an upper part thereof. Herein, the first collimator 10 is disposed so that the GRIN lens 14 is directed upward, and an exposed end of the GRIN lens 14 is coupled to the filter 19.

Similar to the first grip unit 51, the second grip unit 53 includes a second lifting part 53a which is combined to an upper frame (not shown) and moves up and down. The second grip unit 53 also includes a second grip part 53b which is combined to the second lifting part 53a and grips the second collimator 10' in the lower part thereof. Herein, the second collimator 10' is disposed so that GRIN lens 14' is directed downward.

The first and second lifting parts 51a and 53a may be operated with a pneumatic cylinder, a hydraulic cylinder, etc. The first and second lifting parts 51a and 53a may also be operated with a stepping motor having a forward and backward rotation. Hence, the first and second lifting parts 51a and 53a may move up and down while being engaged with a ball screw (not shown).

Figure 5:
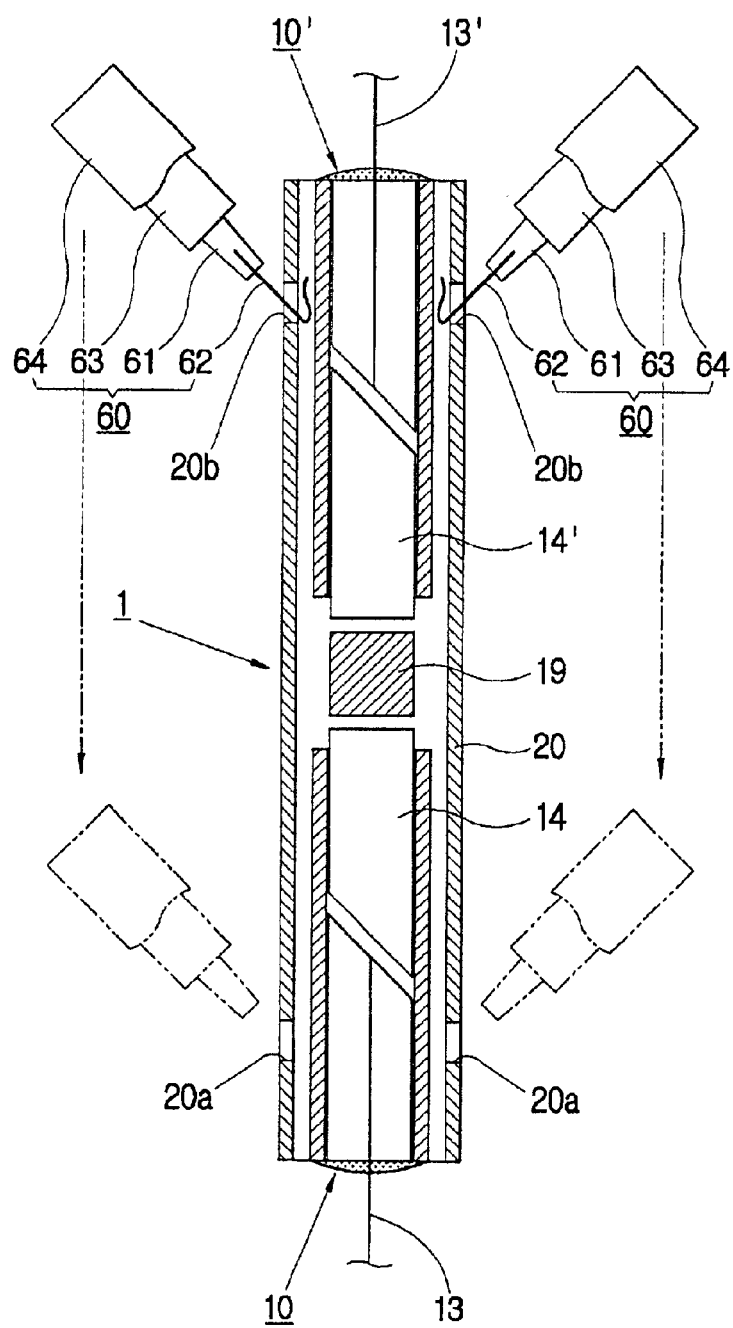
FIG. 5 is a partial enlarged view of the soldering apparatus in FIG. 4.

As shown in FIG. 5, each of the soldering units 60 include a soldering part 61 having a rod shape and disposed adjacent to the first through hole 20a or second through hole 20b of the housing 20. Each soldering unit 60 also includes a soldering rod 62 provided at an end of the soldering part 61 and disposed between the first collimator 10 or the second collimator 10' of the housing 20. The soldering rod 62 passes through the first through hole 20a or second through hole 20b of the housing 20. Each soldering unit 60 includes a heating part 63 which is combined to a rear of the soldering part 61 and heats the soldering rod 62.

The soldering rod 62 is of a relatively small and long wire shape. Because the soldering rod 62 has relatively high ductility, the soldering rod 62 spreads between the first collimator 10 or the second collimator 10' and the housing 20 while being inserted into the first through hole 20a or second through hole 20b of the housing 20. The soldering rod 62 makes contact with an outer wall of the first collimator 10 or the second collimator 10'. To facilitate the soldering rod 62 to be conveniently inserted into the first through hole 20a and the second through 20b, the soldering part 61 is inclinedly disposed toward a longitudinal direction of the housing 20. The heating part 63 preferably includes a lamp using Xenon, but may include a typical heater.

The soldering unit 60 is preferably provided with a soldering unit carrying part 64, like the first lifting part 51a and second lifting part 53*a*. Therefore, after the soldering rod 62 of the soldering unit 60 solders the second collimator 10' through the second through hole 20*b* of the housing 20, the soldering unit 60 moves downward by the carrying part 64 (see the dotted line of FIG. 5), and then the soldering rod 62 of the soldering unit 60 solders the first collimator 10 through the first through hole 20*a* of the housing 20.

The process of manufacturing the collimator assembly 1 will be described hereinbelow, referring to FIGS. 6A through 6H.

The first grip part 51*b* of the first grip unit 51 and the second grip part 53*b* of the second grip unit 53, grip the first collimator 10 and second collimator 10', respectively. Then, when the housing 20 is chucked by the housing chucking part 41 of the housing dispensing unit 40, the control part 70 (as shown in FIG. 6A), controls the housing carrying part 42 of the housing dispensing unit 40 to move the housing 20 to the soldering position "A" between the first collimator 10 and second collimator 10' (see FIG. 6B).

Figure 6C:
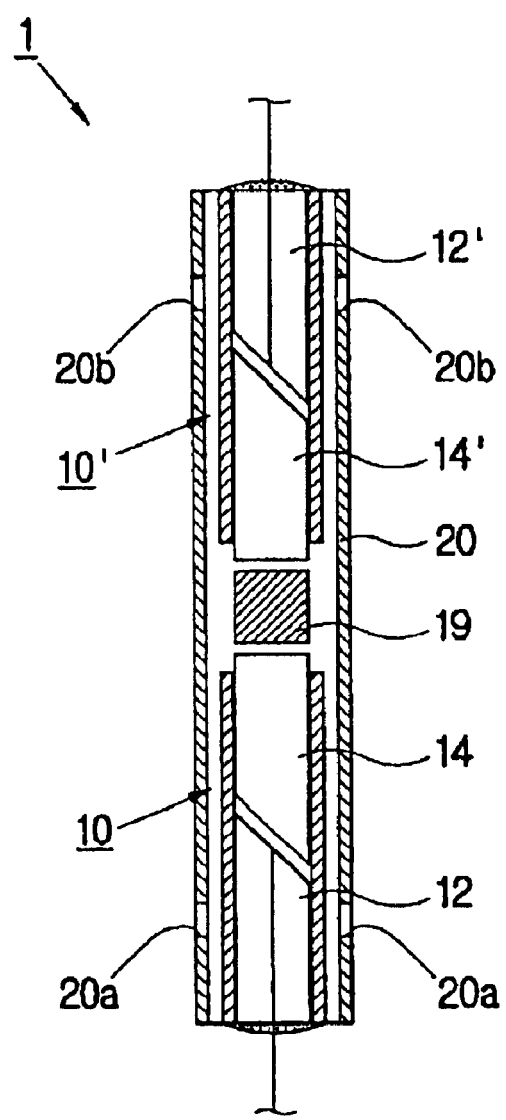

As shown in FIG. 6B, after the housing 20 is disposed between the first collimator 10 and second collimator 10', the control part 70 controls the first lifting part 51*a* and second lifting part 53*a* of the collimator grip unit 50 to insert the first collimator 10 and second collimator 10' into the opposite sides of the housing 20. Thereby, the first collimator 10 and second collimator 10' are coaxially disposed inside the housing 20 (see FIG. 6C).

As shown in FIG. 6C, after the first collimator 10 and second collimator 10' are coaxially inserted in the housing 20, the control part 70 returns the housing dispensing unit 40 to an original position.

Figure 6D:
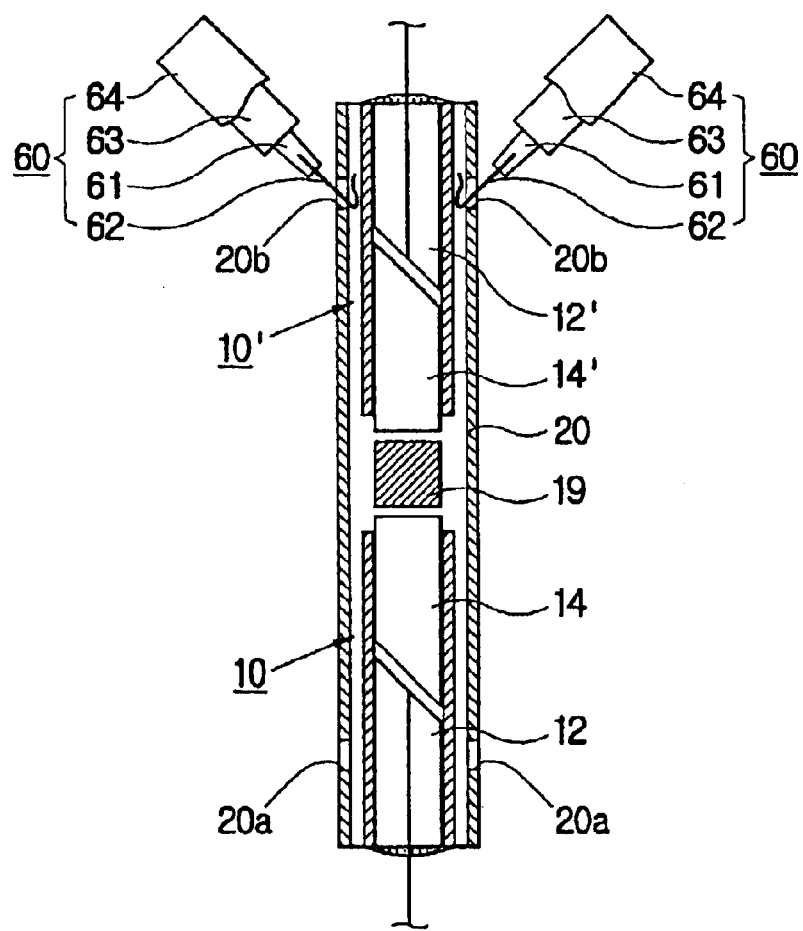
Figure 6E:
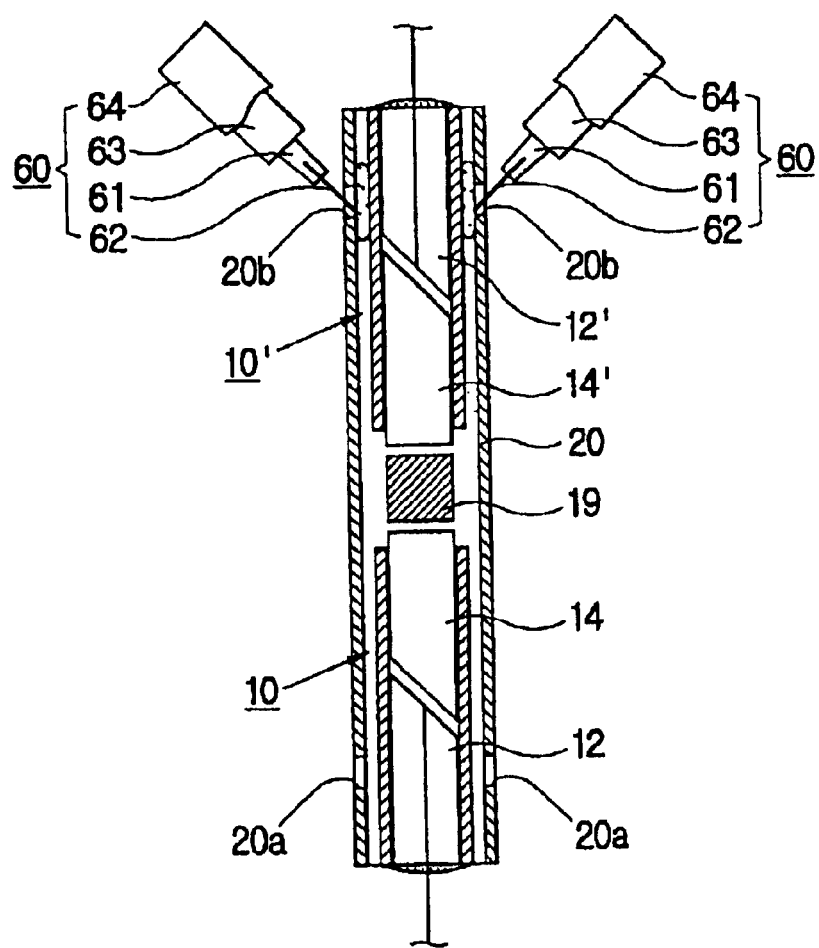

Thereafter, as shown in FIGS. 6D and 6E, the soldering part 61 is disposed adjacently to the second through hole 20*b* by the soldering unit carrying part 64 inclined toward the longitudinal direction of the housing 20. Here, the soldering rod 62 is inserted into the housing 20 through the second through hole 20*b*, and disposed between the second collimator 10' and the housing 20. Further, an amount of the soldering rod 62 is properly controlled by the control part 70. Accordingly, as the soldering rod 62 is disposed between the second collimator 10' and the housing 20, the heating part 63 melts the soldering rod 62 so that the second collimator 10' is soldered to an inside wall of the housing 20.

Figure 6F:
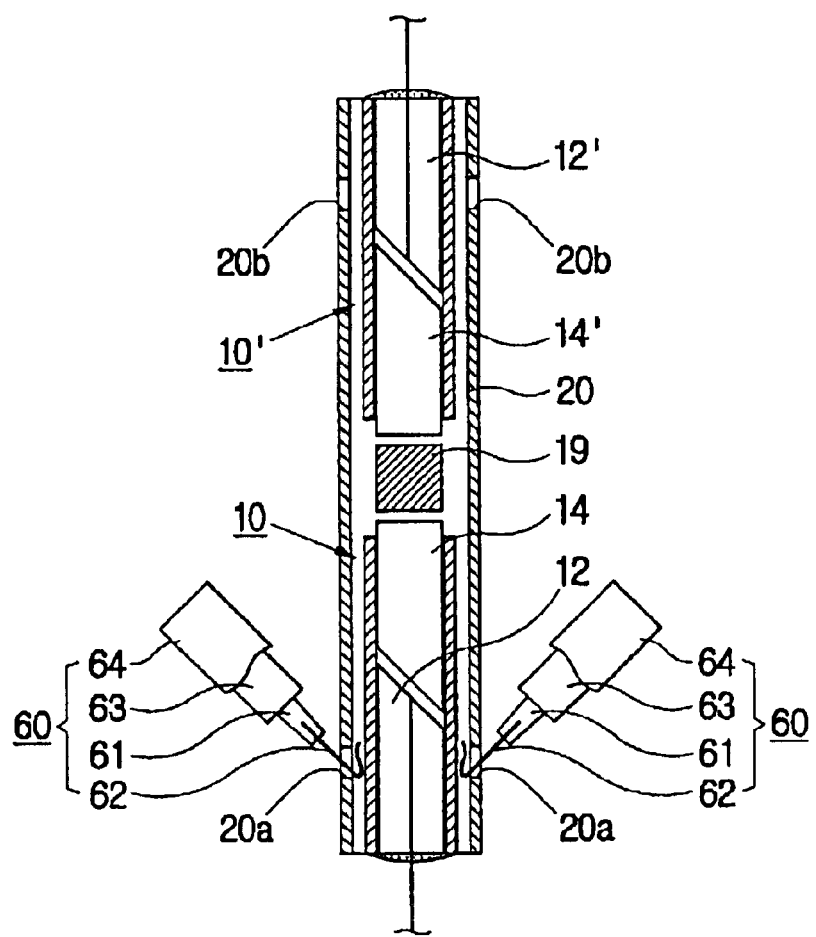
Figure 6G:
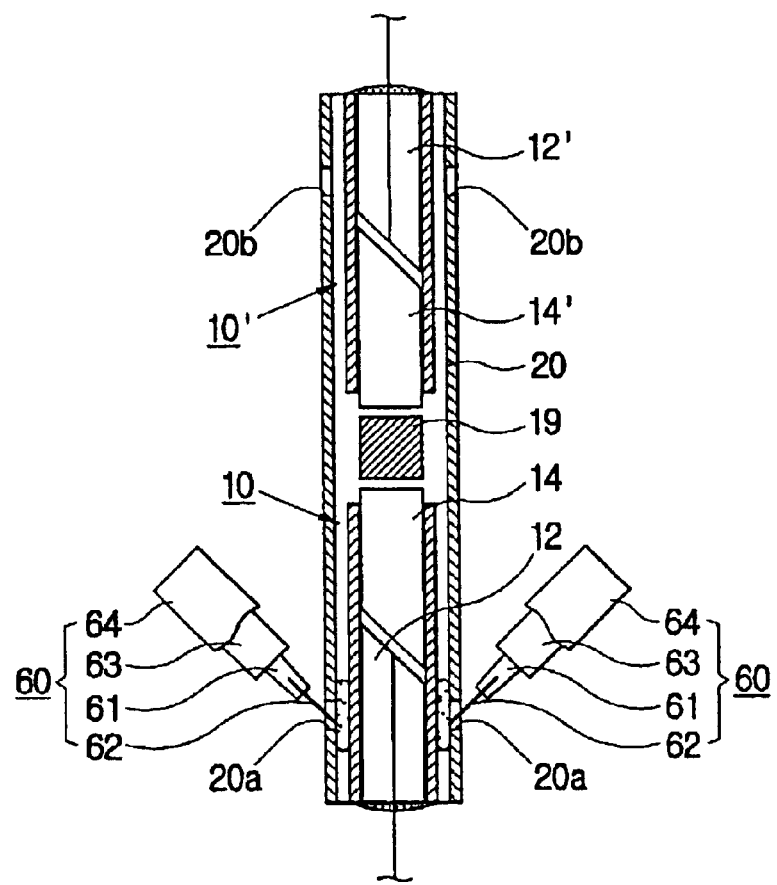

After a soldering process for the second collimator 10' is completed, as shown in FIGS. 6F and 6G, the soldering part 61 is moved adjacently to the first through hole 20*a* by the soldering unit carrying part 64. Here, the soldering rod 62 is disposed between the first collimator 10 and the housing 20 through the first through holes 20*a*. Then, like the second collimator 10', the heating part 63 melts the soldering rod 62 so that the first collimator 10 is soldered to the inside wall of the housing 20.

Figure 6H:
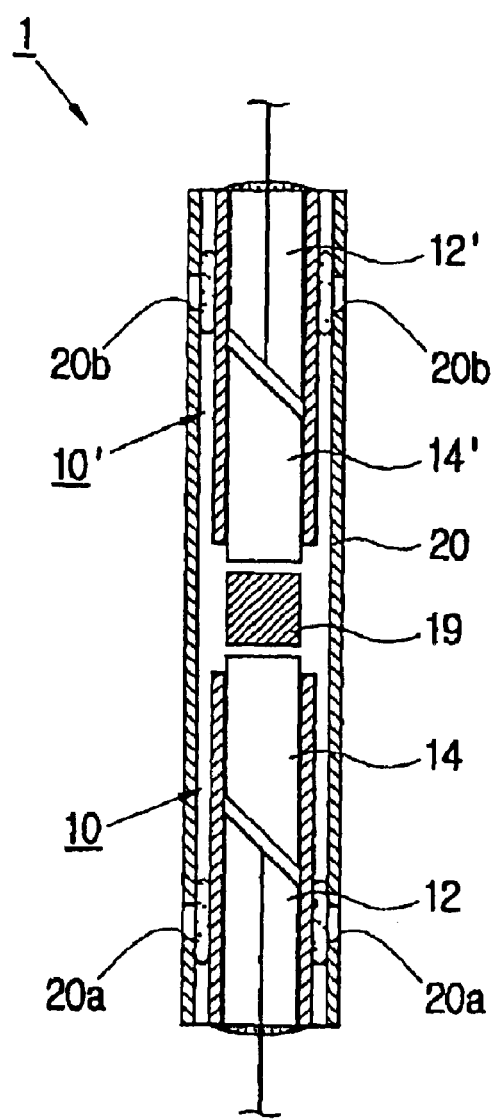

In accordance with the above and as shown in FIG. 6H, the collimator assembly 1 is completed. After the soldering process, the soldering unit 60 returns to an original position.

As described above, the soldering process in manufacturing the collimator assembly 1 is performed automatically so that not only reliability of the collimator assembly is increased, but also productivity thereof is improved by decreasing time taken to manufacture the collimator assembly 1.

Also, as described above, the second collimator 10' is soldered before the first collimator 10. However, the first collimator 10 may be soldered before the second collimator 10'. In addition, if a camera is installed adjacent to the soldering position "A" and a displaying part is provided, the above-described soldering process may be displayed on the displaying part. Therefore, a user may visually monitor the soldering process. Accordingly, a touch screen may be employed as an interface to control the soldering process.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to solder a plurality of collimators into a housing formed with a plurality of through holes spaced from each other at a predetermined distance along a longitudinal direction thereof, comprising:

a housing accommodating part to accommodate the housing;

a housing dispensing unit including a housing chucking part to chuck the housing accommodated in the housing accommodating part, and a housing carrying part to carry the housing chucking part to a predetermined soldering position;

a plurality of collimator grip units including grip parts, each to grip a respective one of the plurality of collimators, and to move near to and distant from each other relative to the soldering position to insert the plurality of collimators into the housing moved to the soldering position; and a soldering unit disposed adjacent to the soldering position, to solder the plurality of collimators into the housing through the through holes of the housing.

2. The apparatus according to claim 1, wherein the plurality of collimator grip units comprise:

a first grip unit having a first grip part to grip a first one of the plurality of collimators, and a first lifting part to move the first grip part to the soldering position; and a second grip unit disposed facing toward the first grip unit, and having a second grip part to grip a second one of the plurality of collimators, and a second lifting part to move the second grip part to the soldering position.

3. The apparatus according to claim 1, wherein the soldering unit comprises:

a soldering part selectively disposed adjacent to the through holes of the housing;

a soldering rod provided at the soldering part and selectively disposed between a corresponding one of the collimators and the housing by passing through the corresponding through hole of the housing; and a heating part combined to the soldering part and heating the soldering rod.

4. The apparatus according to claim 3, wherein the housing comprises a plurality of other through holes spaced from each other at the predetermined distance along the longitudinal direction thereof, the apparatus further comprising:

another soldering unit including:

another soldering part selectively disposed adjacent to the other through holes of the housing;

another soldering rod provided at said another soldering part and selectively disposed between a corresponding one of the collimators and the housing by passing through the corresponding other through hole of the housing; and another heating part combined to said another soldering part and heating said another soldering rod.

5. The apparatus according to claim 4, wherein the soldering unit and said another soldering unit are at a same longitudinal distance from an end of the housing and move in conjunction with each other.

6. The apparatus according to claim 4, wherein the soldering part and said another soldering part are inclinedly disposed toward the longitudinal direction of the housing.

7. The apparatus according to claim 6, further comprising:
a soldering unit carrying part to move the soldering unit along the longitudinal direction of the housing.

8. The apparatus according to claim 7, further comprising:
a control part to automatically control the housing dispensing unit, the plurality of collimator grip units, the soldering unit, and the soldering unit carrying part.

9. The apparatus according to claim 1, wherein the housing chucking part has a clamp shape to chuck and release the housing.

10. The apparatus according to claim 1, further comprising:
a rail, wherein the housing carrying part is slidingly engaged with the rail to move in first and second directions perpendicular to each other.

11. The apparatus according to claim 1, further comprising:
a rail; and
a driving unit provided in the housing carrying part to move the housing carrying part about the rail In first and second directions perpendicular to each other.

12. The apparatus according to claim 2, wherein the first and second grip parts are operated by a stepping motor to rotate the first and second grip parts in a forward and backward rotation.

13. The apparatus according to claim 3, wherein the heating part melts the soldering rod to an inside wall of the housing.

14. The apparatus according to claim 1, further comprising:
a camera to photograph the soldering; and
a displaying part to display the soldering photographed by the camera.

15. A method to solder a plurality of collimators into a housing formed with a plurality of through holes spaced from each other at a predetermined distance along a longitudinal direction thereof, the method comprising:
automatically dispensing the housing to a predetermined soldering position by chucking and carrying the housing;
automatically gripping and inserting the plurality of collimators into the housing moved to the soldering position; and
automatically soldering the plurality of collimators to the housing through the through holes of the housing.

16. The method according to claim 15, wherein the soldering comprises:
automatically inserting a soldering rod at an inclined angle into the through holes of the housing to solder the plurality of collimators to the housing.

17. An apparatus to solder a first and second collimator into a housing formed with a plurality of through holes spaced from each other at a predetermined distance along a longitudinal direction thereof, comprising:
a housing accommodating part to accommodate the housing;
a housing dispensing unit including a housing chucking part to chuck the housing accommodated in the housing accommodating part, and a housing carrying part to carry the housing chucking part to a predetermined soldering position;
a first collimator grip unit and a second collimator grip unit having a first and second grip part, respectively, wherein the first grip part grips the first collimator and the second grip part grips the second collimator, and move near to and distant from each other relative to the soldering position to insert the first collimator and the second collimator into the housing moved to the soldering position; and
a soldering unit disposed adjacent to the soldering position to solder the first and second collimator into the housing through the through holes of the housing.

18. The apparatus according to claim 17, wherein a filter is provided between the first and second collimator to filter light traveling from the first collimator and the second collimator.

19. The apparatus according to claim 17, wherein the first collimator grip unit includes a first lifting part to move the first grip part to the soldering position, and the second collimator grip unit includes a second lifting part to move the second grip to the soldering position, said second grip unit being disposed facing toward the first grip unit.

20. The apparatus according to claim 17, wherein the soldering unit comprises:
a soldering part selectively disposed adjacent to the through holes of the housing;
a soldering rod provided at the soldering part and disposed between the corresponding collimator and the housing by passing through the corresponding through hole of the housing; and
a heating part combined to the soldering part and heating the soldering rod.

21. The apparatus according to claim 20, wherein the soldering part is inclinedly disposed relative to the longitudinal direction of the housing.

22. The apparatus according to claim 21, further comprising:
a soldering unit carrying part to move the soldering unit along the longitudinal direction of the housing.

23. The apparatus according to claim 22, further comprising:
a control part to automatically control the housing dispensing unit, the first and second collimator grip unit, the soldering unit, and the soldering unit carrying part.

24. A method to solder a first collimator and a second collimator into a housing formed with a plurality of through holes spaced from each other at a predetermined distance along a longitudinal direction thereof, the method comprising:
automatically dispensing the housing to a predetermined soldering position by chucking and carrying the housing;
automatically gripping and inserting the first and second collimator into the housing moved to the soldering position; and
automatically soldering the first and second collimator to the housing through the through holes of the housing at an inclined position.

25. The method according to claim 24, wherein the soldering comprises:
automatically inserting a soldering rod into the through holes of the housing to solder the first and second collimator to the housing.

26. A method to solder a plurality of collimators into a housing formed with a plurality of through holes spaced from each other at a predetermined distance along a longitudinal direction thereof, the method comprising:

dispensing the housing to a predetermined soldering position;

inserting the plurality of collimators into the housing moved to the soldering position;

soldering the plurality of collimators to the housing through the through holes of the housing; and automatically controlling the dispensing, inserting, and soldering, to solder the collimators.

27. The method according to claim 26, wherein the soldering comprises:

automatically inserting a soldering rod at an inclined angle into the through holes of the housing to solder the plurality of collimators to the housing.

* * * * *

UNITED STATES PATENT AND TRADEMARK OFFICE
CERTIFICATE OF CORRECTION

PATENT NO.    : 6,826,328 B2                                               Page 1 of 1
DATED         : November 30, 2004
INVENTOR(S)   : Myeon-soon Hwang et al.

It is certified that error appears in the above-identified patent and that said Letters Patent is hereby corrected as shown below:

Title page,
Item [73], Assignee, change "Samsung Electronics Co., Ltd., Suwon (KR)" to
-- Samsung Electronics Co., Ltd., Suwon-si (KR) --.

Column 7,
Line 27, replace "In" with -- in --.

Signed and Sealed this

Seventeenth Day of May, 2005

JON W. DUDAS
*Director of the United States Patent and Trademark Office*